United States Patent
Xu et al.

(10) Patent No.: US 10,630,684 B2
(45) Date of Patent: Apr. 21, 2020

(54) PPPOE PACKETS TRANSMITTING METHOD AND PPPOE SERVER THEREOF

(71) Applicant: WANGSU SCIENCE & TECHNOLOGY CO., LTD., Shanghai (CN)

(72) Inventors: Jiaxuan Xu, Shanghai (CN); Duyong Cheng, Shanghai (CN); Shengwan Wu, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 248 days.

(21) Appl. No.: 15/735,909

(22) PCT Filed: Apr. 12, 2017

(86) PCT No.: PCT/CN2017/080245
§ 371 (c)(1),
(2) Date: Dec. 12, 2017

(87) PCT Pub. No.: WO2018/176510
PCT Pub. Date: Oct. 4, 2018

(65) Prior Publication Data
US 2019/0007403 A1 Jan. 3, 2019

(30) Foreign Application Priority Data
Mar. 30, 2017 (CN) .......................... 2017 1 0203829

(51) Int. Cl.
*H04L 29/06* (2006.01)
*H04L 12/28* (2006.01)
(Continued)

(52) U.S. Cl.
CPC ...... *H04L 63/0876* (2013.01); *H04L 12/2859* (2013.01); *H04L 61/2007* (2013.01);
(Continued)

(58) Field of Classification Search
None
See application file for complete search history.

(56) References Cited

U.S. PATENT DOCUMENTS

2007/0133576 A1 6/2007 Tsuge et al.
2007/0274290 A1* 11/2007 Takahashi ........... H04L 12/4625
370/351
(Continued)

OTHER PUBLICATIONS

The European Patent Office (EPO) The Extended European Search Report for 17849864.8 (PCT/CN2017/080245) dated Nov. 19, 2018 8 Pages.
(Continued)

*Primary Examiner* — Joseph P Hirl
*Assistant Examiner* — Hassan Saadoun
(74) *Attorney, Agent, or Firm* — Anova Law Group, PLLC

(57) ABSTRACT

The present disclosure provides a PPPoE packets transmitting method and a PPPoE server. The method comprises: registering, by a PPPoE server, a PPPoE protocol packet sniffer with a Linux kernel and an Internet Protocol Version 4 (IPV4) protocol packet sniffer with a Netfilter framework, and adding a user's IP address and MAC address to authenticated user information, receiving, by the PPPoE server, a packet, and calling, by the PPPoE server, the PPPoE protocol packet sniffer or the IPV4 protocol packet sniffer to process and transmit the packet according to the authenticated user information. In the present disclosure, during a user's dial-up logon or logoff, the creation and deletion of a network interface are not required, which can improve the logon and logoff speeds.

12 Claims, 3 Drawing Sheets

(51) Int. Cl.
*H04L 29/12* (2006.01)
*H04L 29/08* (2006.01)

(52) U.S. Cl.
CPC .......... *H04L 63/0236* (2013.01); *H04L 63/08* (2013.01); *H04L 69/324* (2013.01); *H04L 61/6022* (2013.01)

(56) References Cited

U.S. PATENT DOCUMENTS

2007/0286371 A1* 12/2007 Shima ................ H04M 3/567
 379/142.01
2014/0181319 A1* 6/2014 Chen .................. H04L 47/33
 709/234
2016/0359681 A1* 12/2016 McGleenon ........ H04L 43/0876

OTHER PUBLICATIONS

David F Skoll Roaring Penguin Software Inc DFSRhooaringPenguin Com et al A PPPoE Implementation for Linux Aug. 26, 2003 pp. 1-7 XP061011860.

* cited by examiner

PPPOE PACKETS TRANSMITTING METHOD AND PPPOE SERVER THEREOF

CROSS-REFERENCE TO RELATED APPLICATION

This application is a national phase entry under 35 U.S.C. § 371 of International Application No. PCT/CN2017/080245, filed on Apr. 12, 2017, which claims priority to Chinese Patent Application No. 201710203829.5, filed on Mar. 30, 2017, the entire content of all of which is incorporated herein by reference.

FIELD OF THE DISCLOSURE

The present disclosure generally relates to network transmission technology and, more particularly, to a method for transmitting PPPoE packets and a PPPoE server thereof.

BACKGROUND

With the development of network technology, the broadband access has currently become a major way of user access. The major way of the broadband dial-up and authentication is the Point-to-Point Protocol over Ethernet (PPPoE.) The performance indicators of a PPPoE Broadband Remote Access Server generally include the logon and logoff speeds of the dial-up and authentication.

The existing solution for implementing a PPPoE Broadband Remote Access Server on the Linux platform is to create a virtual network interface (e.g., ppp0) for each dial-up user and delete the virtual network interface when the user logs off. The objectives of creating the virtual network interface is to realize the termination of PPPoE packets and the forwarding of data packets. However, the creation and deletion of a virtual network interface involves a lot of time-consuming tasks in the bottom layer, for example, memory request and release, system call, central processing unit (CPU) privilege level switch. The creation and deletion of the above virtual network interface can lead to a slow dial-up logon and logoff.

SUMMARY

To solve the problem of the existing broadband access technologies, in which the creation and deletion of a virtual network interface can lead to a slow dial-up logon and logoff. The present disclosure provides a PPPoE packets transmitting method and a PPPoE server. The technical solutions are as follows.

One aspect of the present disclosure provides a method for PPPoE packets transmitting comprising: registering, by a PPPoE server, a PPPoE protocol packet sniffer with a Linux kernel and an Internet Protocol Version 4 (IPV4) protocol packet sniffer with a Netfilter framework, and adding a user's Internet Protocol (IP) address and media access control (MAC) address to authenticated user information, receiving, by the PPPoE server, a packet; and calling, by the PPPoE server, the PPPoE protocol packet sniffer or the IPV4 protocol packet sniffer to process and transmit the packet according to the authenticated user information.

Furthermore, calling, by the PPPoE server, the PPPoE protocol packet sniffer or the IPV4 protocol packet sniffer to process and transmit the packet according to the authenticated user information, includes: determining, by the PPPoE server, whether the packet is a user's uplink packet or a user's downlink packet, when the packet is the user's uplink packet, calling, by the PPPoE server, the PPPoE protocol packet sniffer, and determining, by the PPPoE protocol packet sniffer, whether the packet is a PPPoE data packet and, when the packet is the PPPoE data packet, according to the authenticated user information, striping off header information of the PPPoE data packet, and forwarding the processed PPPoE data packet to the Internet-side, and when the packet is the user's downlink packet, calling, by the PPPoE server, the IPV4 protocol packet sniffer, and adding, by the IPV4 protocol packet sniffer, according to the authenticated user information, header information to the user's downlink packet and forwarding the processed PPPoE data packet to the user.

Furthermore, calling, by the PPPoE server, the PPPoE protocol packet sniffer, and determining, by the PPPoE protocol packet sniffer, whether the packet is the PPPoE data packet and, when the packet is the PPPoE data packet, according to the authenticated user information, striping off the header information of the PPPoE data packet, and forwarding the processed PPPoE data packet to the Internet-side, includes: determining, by the PPPoE protocol packet sniffer, according to a value of an Ethernet packet protocol field, that the PPPoE is currently in a PPP Session Stage, determining, by the PPPoE protocol packet sniffer, according to a PPP packet header protocol field, that the packet is the PPPoE data packet, obtaining, by the PPPoE protocol packet sniffer, the MAC address from an Ethernet packet header and the IP address from an IPV4 packet header, comparing, by the PPPoE protocol packet sniffer, the MAC address and IP address with information in the authenticated user information, when the MAC address and IP address match with information in the authenticated user information, determining that the user belongs to authenticated users and striping off the header of the PPPoE data packet to forward the processed PPPoE data packet to the Internet-side, and when the MAC address and IP address do not match with information in the authenticated user information, determining that the user does not belong to the authenticated users and throwing away the PPPoE data packet.

Furthermore, calling, by the PPPoE server, the IPV4 protocol packet sniffer, and adding, by the IPV4 protocol packet sniffer, according to the authenticated user information, header information to the user's downlink packet and forwarding the processed PPPoE data packet to the user, includes: obtaining, by the IPV4 protocol packet sniffer, the user's IP address from the IPV4 packet header, comparing, by the IPV4 protocol packet sniffer, the IP address with the information in the authenticated user information, when the IP address matches with the information in the authenticated user information, determining that the user belongs to the authenticated users and adds the header information to the user's downlink packet to forward the processed packet to the user, and when the IP address does not match with the information in the authenticated user information, determining that the user does not belong to the authenticated users and throwing away the downlink packet.

Furthermore, every time the user logs on the Internet, the PPPoE protocol packet sniffer registers with the Linux kernel and the IPV4 protocol packet sniffer registers with the Netfilter framework by the PPPoE server, and every time after the user successfully logs off, the PPPoE server removes the PPPoE protocol packet sniffer from the Linux kernel and the IPV4 protocol packet sniffer from the Netfilter framework, and deletes corresponding information of the user who successfully logs off from the authenticated user information.

Furthermore, when the user logs on the Internet for a first time after user initialization or restart, the PPPoE protocol packet sniffer registers with the Linux kernel and the IPV4 protocol packet sniffer registers with the Netfilter framework, and after the user successfully logs off, deletes the user's corresponding information from the authenticated user information Furthermore, the PPPoE server registers the IPV4 protocol packet sniffer with a POSTROUTING chain of the Netfilter framework.

Another aspect of the present disclosure provides an Point-to-Point Protocol over Ethernet (PPPoE) server comprising: a registration unit configured to register a PPPoE protocol packet sniffer with a Linux kernel and an IPV4 protocol packet sniffer with a Netfilter framework, and add a user's IP address and MAC address to authenticated user information, a receiving unit configured to receive a packet, and a processing unit configured to call the PPPoE protocol packet sniffer or the IPV4 protocol packet sniffer and, according to the authenticated user information, process and transmit the packet.

Furthermore, a determination module is configured to determine whether the packet is a user's uplink packet or a user's downlink packet.

A first call module is configured, when the packet is the user's uplink packet, to call the PPPoE protocol packet sniffer, the PPPoE protocol packet sniffer determines whether the packet is a PPPoE data packet and, when the received packet is the PPPoE data packet, according to the authenticated user information, strips off header information of the PPPoE data packet, and forwards the processed PPPoE data packet to the Internet-side.

A second call module is configured, when the packet is the user's downlink packet, to call the IPV4 protocol packet sniffer, the IPV4 protocol packet sniffer, according to the authenticated user information, adds header information to the user's downlink packet and forwards the processed PPPoE data packet to the user.

Furthermore, the PPPoE protocol packet sniffer includes:

A first determination module is configured, according to a value of an Ethernet packet protocol field, to determine that the PPPoE is currently in a PPP Session Stage;

A second determination module is configured, according to a PPP packet header protocol field, to determine that the packet is the PPPoE data packet;

A first acquisition module is configured to obtain the MAC address from an Ethernet packet header and the IP address from an IPV4 packet header;

A first comparison module is configured to compare the MAC address and IP address with information in the authenticated user information;

A first forwarding module is configured, when the MAC address and IP address match with information in the authenticated user information, to determine that the user belongs to authenticated users and strip off header of the PPPoE data packet to forward the processed PPPoE data packet to the Internet-side; and A first throw-away module is configured, when the MAC address and IP address do not match with information in the authenticated user information, to determine that the user does not belong to the authenticated users and throw away the PPPoE data packet.

Furthermore, the IPV4 protocol packet sniffer includes: a second acquisition module configured to obtain the user's IP address from the IPV4 packet header, a second comparison module configured to compare the IP address with the information in the authenticated user information, a second forwarding module configured, when the IP address matches with information in the authenticated user information, to determine that the user belongs to the authenticated users and add the header information to the user's downlink packet to forward the processed packet to the user, and a second throw-away module configured, when the IP address does not match with information in the authenticated user information, to determine that the user does not belong to the authenticated users and throw away the downlink packet.

Furthermore, the PPPoE server also includes a removing unit configured, after the user successfully logs off, to remove the PPPoE protocol packet sniffer from the Linux kernel and the IPV4 protocol packet sniffer from the Netfilter framework, and to delete the user's corresponding information from the authenticated user information.

The beneficial effect of the technical solutions according to embodiments of the present disclosure is as the following. The registration and deletion of a IPV4 protocol packet sniffer in the Netfilter framework and a PPPoE protocol packet sniffer in the Linux kernel are used to replace the creation and deletion of a virtual network interface, and the authenticated user information is stored. After receiving the packet, the PPPoE server calls the corresponding protocol packet sniffer and according to the authenticated user information to process the packet header and transmit the processed packet. As such, the correct processing and the normal transmission of the user's uplink data packets and downlink data packets can be ensured. The proposed method reduces the time cost for the creation of the network interface during the logon process and the time cost for the destruction of the network interface during the logoff process, such that the logon and logoff speeds for user dial-up during the process of a PPPoE broadband access on the Linux platform can be effectively increased.

BRIEF DESCRIPTION OF THE DRAWINGS

In order to provide a clearer illustration of technical solutions of the present disclosure, the drawings used in the description of the disclosed embodiments are briefly described below. It is apparent that the following drawings are merely some of embodiments of the present disclosure. Other drawings may be obtained based on the disclosed drawings by those skilled in the art without creative efforts.

DETAILED DESCRIPTION

In order to make the objectives, technical solutions, and advantages of the present disclosure clearer, embodiments of the present disclosure are described in detail below with reference to the drawings.

To solve the problem of the existing broadband access technology in which the creation and deletion of the virtual network interface can lead to a slow dial-up logon and logoff, the virtual network interface can be replaced to increase the logon and logoff speeds. However, the following problems caused by the absence of the virtual network interface need to be considered for solving.

(1) After receiving the user's uplink data packets and downlink data packets, the PPPoE server cannot process the uplink data packets and downlink data packets, which includes adding and deleting the PPPoE packet header.

(2) The kernel forwards data according to the network interface and the routing table. There is no network interface that is created corresponding to the client-side, thus, the user's uplink data packets and downlink data packets cannot be normally forwarded.

Figure 1:
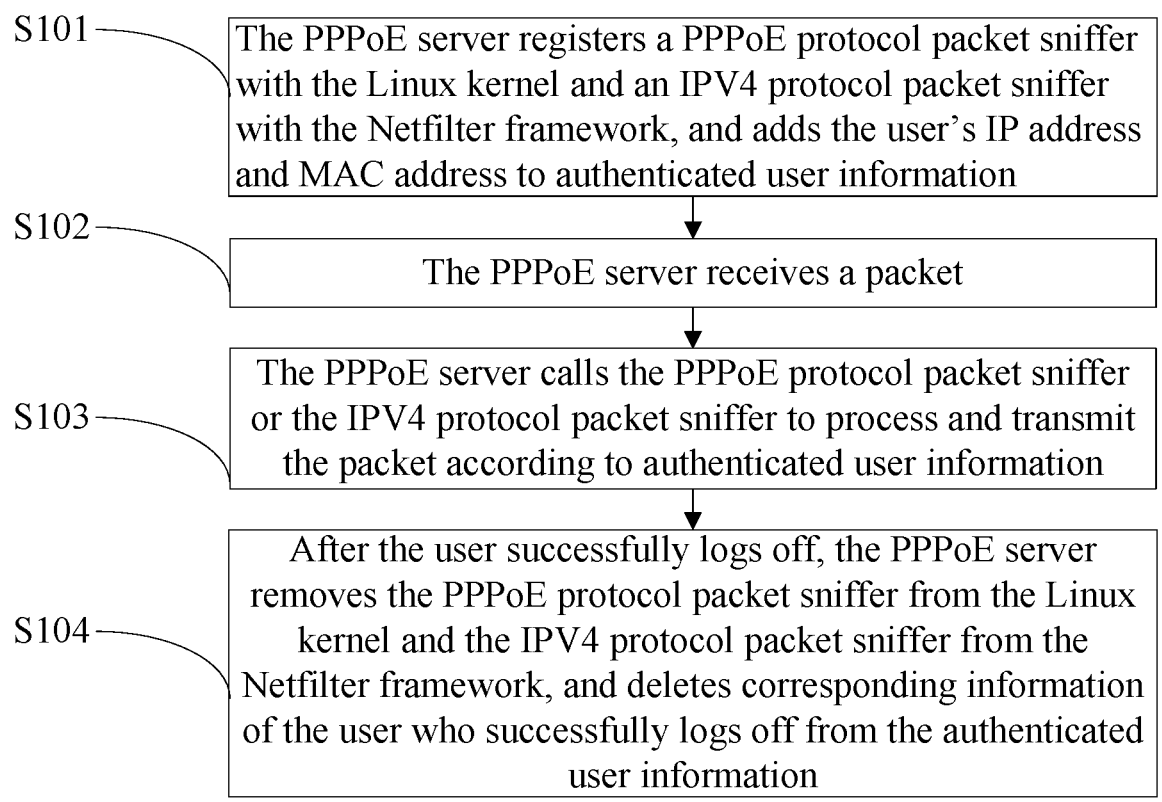
FIG. 1 is a flow chart of a method for transmitting PPPoE packets according to embodiments of the present disclosure.

In view of the above problems, embodiments of the present disclosure provide a method for transmitting PPPoE packets. As shown in FIG. 1, the method includes the following steps S101 to S104.

At step S101, the PPPoE server registers a PPPoE protocol packet sniffer with the Linux kernel and an Internet Protocol Version 4 (IPV4) protocol packet sniffer with the Netfilter framework, and adds the user's Internet Protocol (IP) address and media access control (MAC) address to authenticated user information.

In the present embodiment, after the user dial-up authorization succeeds, the PPPoE server starts to register the PPPoE protocol packet sniffer and the IPV4 protocol packet sniffer. The user dial-up authentication refers to the process that the user enters the user name and password for dial-up Internet connection on the client-side, and the server-side determines whether the received user name and password are correct. If correct, a message is returned to the client-side and the dial-up authentication succeeds. Specifically, the PPPoE server registers the PPPoE protocol packet sniffer with the Linux kernel and the IPV4 protocol packet sniffer with the POSTROUTING chain of the Netfilter framework. The PPPoE protocol packet sniffer is mainly used for terminating the user's uplink PPPoE packet, and the IPV4 protocol packet sniffer is mainly used to add the PPPoE packet header to the user's downlink data packet. The authenticated user information can be stored in the form of a list, which is easy for query and comparison.

In the present embodiment, the PPPoE protocol packet sniffer and the IPV4 protocol packet sniffer may be registered every time that the user logs on the Internet. The PPPoE protocol packet sniffer and the IPV4 protocol packet sniffer may also be registered, when the user logs on the Internet for a first time after user initialization or restart. The present disclosure is not limited thereto.

At step S102, the PPPoE server receives a packet. The PPPoE data packet belongs to the Layer 2 packet and is carried in the data field of the Ethernet packet for transmission. The value of the Ethernet packet's protocol field is 0x8863, which indicates that the PPPoE is in the Activity Discovery Phase. The value of the Ethernet packet's protocol field is 0x8864, which indicates that the PPPoE is in the PPP Session Stage. The Layer 3 packet corresponding to the PPPoE data packet are the IPV4 packet. The PPPoE data packet carries the Point-to-Point Protocol (PPP) packet. The PPP packet header protocol field is used to distinguish the contents of the data packets carried by the PPPoE packets. For example, 0021 represents the IP protocol, and C021 represents the Link Control Protocol (LCP).

At step S103, the PPPoE server calls the PPPoE protocol packet sniffer or the IPV4 protocol packet sniffer to process and transmit the packet according to the authenticated user information.

At step S104, after the user successfully logs off, the PPPoE server removes the PPPoE protocol packet sniffer from the Linux kernel and the IPV4 protocol packet sniffer from the Netfilter framework, and deletes corresponding information of the user who successfully logs off from the authenticated user information.

Step 104 is not a necessary step, which corresponds to the situation when the PPPoE protocol packet sniffer and the IPV4 protocol packet sniffer are registered every time that the user logs on the Internet. That is, if the PPPoE server removes the PPPoE protocol packet sniffer from the Linux kernel and the IPV4 protocol packet sniffer from the Netfilter framework, and deletes the user's corresponding information from the authenticated user information, then the PPPoE protocol packet sniffer and the IPV4 protocol packet sniffer need to be registered every time that the user logs on the Internet.

In other embodiments, the PPPoE protocol packet sniffer and the IPV4 protocol packet sniffer may also be registered, when the user logs on the Internet for a first time after user initialization or restart. After the user successfully logs off, only the user's corresponding information is deleted from the authenticated user information, and step 104 is not necessary. Therefore, the user's logon time can be further shorten.

In the above-described embodiment, the registration and deletion of a IPV4 protocol packet sniffer in the Netfilter framework and a PPPoE protocol packet sniffer in the Linux kernel are used to replace the creation and deletion of a virtual network interface, and the authenticated user information is stored. After receiving the packet, the PPPoE server calls the corresponding protocol packet sniffer and according to the authenticated user information to process the packet header and transmit the processed packet. As such, the correct processing and the normal transmission of the user's uplink data packets and downlink data packets can be ensured. The proposed method reduces the time cost for the creation of the network interface during the logon process and the time cost for the destruction of the network interface during the logoff process, such that the logon and logoff speeds for user dial-up during the process of a PPPoE broadband access on the Linux platform can be effectively increased.

In an embodiment, step S103 includes the followings. The PPPoE server determines whether the received packet is the user's uplink packet or the user's downlink packet. If the received packet is the user's uplink packet, the PPPoE server calls the PPPoE protocol packet sniffer. The PPPoE protocol packet sniffer determines whether the received packet is a PPPoE data packet and, if the received packet is a PPPoE data packet, according to the authenticated user information, strips off header information of the PPPoE data packet, and forwards the processed PPPoE data packet to the Internet-side. If the received packet is the user's downlink packet, the PPPoE server calls the IPV4 protocol packet sniffer. The IPV4 protocol packet sniffer, according to the authenticated user information, adds header information to the user's downlink packet and forwards the processed PPPoE data packet to the user. The Internet-side is relative to the client-side. After obtaining dial-up Internet access, the user may send data to the Internet-side or receive data from the Internet-side.

In the above embodiment, for the user's uplink data packets and downlink data packets, the sniffers used are different and the processing of the header information is also different. Therefore, the packet needs to be determined to further determine the subsequent processing procedure and realize the normal forwarding of the user's uplink data packets and downlink data packets. At the same time, it is also necessary to determine, according to the authenticated user information stored in advance, whether the current user has authenticated. If the user is not authenticated, the unnecessary packet is directly thrown away to avoid the occupation of resources. If the user is authenticated, the packet is forwarded to the corresponding user or the Internet-side to ensure the smooth transmission of the packet.

Specifically, for the user's uplink data packet, after the PPPoE server calls the PPPoE protocol packet sniffer, the PPPoE protocol packet sniffer performs the following operations. The PPPoE protocol packet sniffer, according to the value of the Ethernet packet protocol field, determines that the PPPoE is currently in the PPP Session Stage (as described above, the value of the protocol field is 0x8864 indicating that the PPPoE is in the PPP Session Stage.) The PPPoE protocol packet sniffer, according to the PPP packet header protocol field, determines that the packet is a PPPoE packet (as described above, the PPP packet header protocol field is 0021 indicating the IP protocol, and the corresponding Layer 2 packet is a PPPoE packet.) The PPPoE protocol packet sniffer obtains the MAC address from the Ethernet packet header and the IP address from the IPV4 packet header. The PPPoE protocol packet sniffer compares the MAC address and IP address with information in the authenticated user information and, if match, determines that the user belongs to the authenticated users and strips off header of the PPPoE data packet to forward the processed PPPoE data packet to the Internet-side and, if not match, determines that the user does not belong to the authenticated users and throws away the PPPoE data packet. If the intercepted packet is not a PPPoE data packet, the processing of the PPPoE control packet is entered, and the control packet processing method will not be discussed in the present disclosure.

Specifically, for the user's downlink packet, after the PPPoE server calls the IPV4 protocol packet sniffer, the IPV4 protocol packet sniffer performs the following operations. The IPV4 protocol packet sniffer obtains the user's IP address from the IPV4 packet header. The IPV4 protocol packet sniffer compares the IP address with information in the authenticated user information and, if match, determines that the user belongs to the authenticated users and adds the header information to the user's downlink packet to forward the processed packet to the user and, if not match, determines that the user does not belong to the authenticated users and throws away the downlink packet.

The processing procedure of the user's uplink and downlink data according to embodiments of the present disclosure will be described below with reference to FIGS. 2 and 3.

Figure 2:
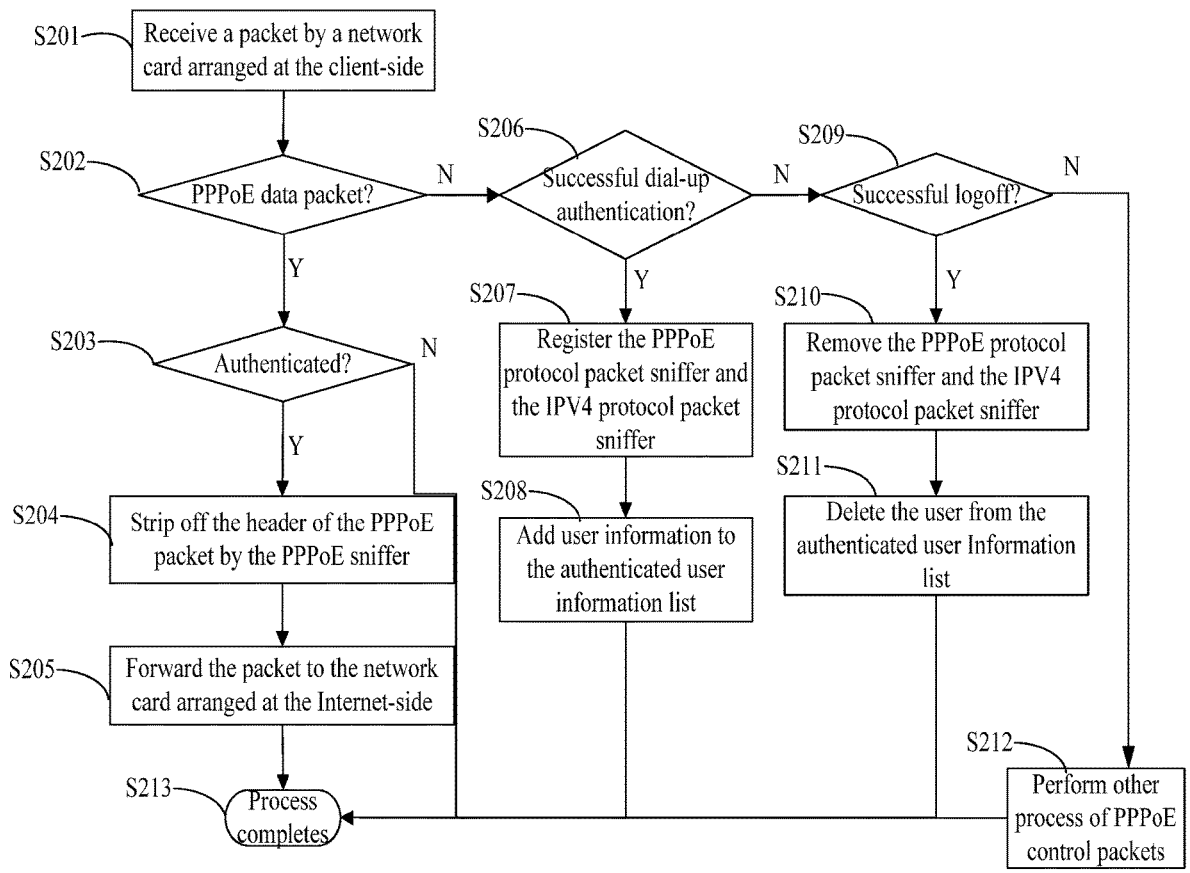
FIG. 2 is flow chart of processing of a user's uplink data packet according to embodiments of the present disclosure.

FIG. 2 is flow chart of processing of the user's uplink data packet according to embodiments of the present disclosure. As shown in FIG. 2, the processing procedure of the user's uplink data packet includes the following steps.

At step S201, a network card arranged at the client-side receives a packet.

At step S202, the PPPoE server calls the PPPoE protocol packet sniffer to determine whether the received packet is a PPPoE data packet and, if yes, the process proceeds to step S203 and, if no, the process proceeds to step S206.

At step S203, according to an authorized user information list, whether the user has been authorized is determined and, if yes, the process proceeds to step S204 and, if no, the packet is directly thrown away, and the process proceeds to step S213.

At step S204, the PPPoE protocol packet sniffer strips off the header of the PPPoE data packet.

At step S205, the PPPoE protocol packet sniffer forwards the processed PPPoE data packet to the Internet-side, and the process proceeds to step S213.

At step S206, the PPPoE server determines whether the user dial-up authentication is successful and, if yes, the process proceeds to step S207 and, if not, the process proceeds to step S209.

At step S207, the PPPoE server registers the PPPoE protocol packet sniffer with the Linux kernel and the IPV4 protocol packet sniffer with the Netfilter framework.

At step S208, the PPPoE server adds user information (IP address and MAC address) to the authorized user information list, and then proceeds to step S213.

At step S209, the PPPoE server determines whether the user logs off successfully and, if yes, the process proceeds to step S210; if not, the process proceeds to step S212.

At step S210, the PPPoE server removes the PPPoE protocol packet sniffer from the Linux kernel and the IPV4 protocol packet sniffer from the Netfilter framework.

At step S211, the PPPoE server deletes information corresponding to the user from the authorized user information list, and then the process proceeds to step S213.

At step S212, the other processing of PPPoE control packet is performed and then the process proceeds to step S213.

Step S213, the process completes.

Figure 3:
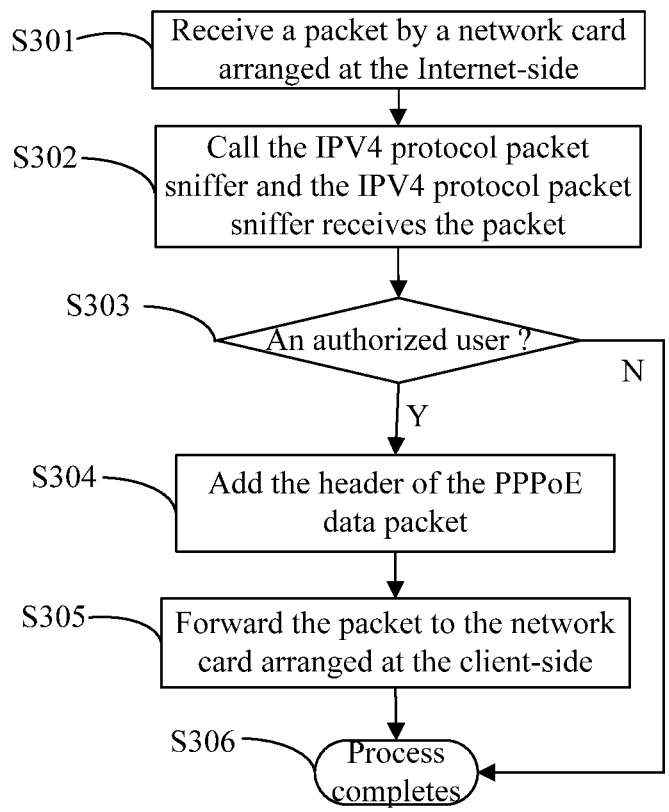
FIG. 3 is flow chart of processing of a user's downlink data packet according to embodiments of the present disclosure.

FIG. 3 is flow chart of processing of the user's downlink data packet according to embodiments of the present disclosure. As shown in FIG. 3, the processing procedure of the user's downlink data packet includes the following steps.

At step S301, a network card arranged at the Internet-side receives a packet.

At step S302, the PPPoE server calls the IPV4 protocol packet sniffer and the IPV4 protocol packet sniffer receives the packet.

At step S303, the IPV4 protocol packet sniffer determines whether the target user is an authorized user and, if yes, the process proceeds to step S304 and, if not, the packet is directly thrown away and the process proceeds to step S306.

At step S304, the IPV4 protocol packet sniffer adds the header of the PPPoE data packet to the packet.

At step S305, the IPV4 protocol packet sniffer performs the forwarding and forwards the packet to the network card arranged at the client-side.

Step S306, the process completes.

The PPPoE protocol includes the Activity Discovery Phase and the PPP Session Stage. When a client-host wants to start a PPP Session, an Activity Discovery Phase needs to be firstly implemented to identify the MAC address of the opposite party and establish a unique PPP Session ID (identification). During the Activity Discovery Phase, the client-host discovers all the servers and chooses one of them to establish a point-to-point connection. When a PPP Session is established, the entire Activity Discovery Phase is completed and the PPP Session Stage is entered. In the PPP Session Stage, between the host and the server, according to the PPP protocol, PPP data is transmitted, and various PPP negotiations and the PPP data transmission are performed. The transmitted packet contains the PPP Session ID determined at the Activity Discovery Phase and the PPP Session ID remains unchanged.

The user first goes through the Activity Discovery Phase and, after the completion of the Activity Discovery Phase, enters the PPP Session Stage. After the user authentication succeeds, the PPPoE server does not create the virtual network interface corresponding to the user, but registers the PPPoE protocol packet sniffer with the Linux kernel and the IPV4 protocol packet sniffer with the Netfilter framework, and adds the user IP and the MAC mapping the authorized user information list.

The PPPoE protocol packet sniffer is called when the user's uplink packet passes through the PPPoE server. The PPPoE protocol packet sniffer, according to the contents of the authorized user information list, determines whether the user who sent the packet has successfully authenticated. If the user's uplink packet is the authenticated user's uplink packet, the PPPoE packet sniffer strips off the PPPoE packet header and performs the forwarding to forward the packet to the network card arranged at the Internet-side. As such, the problem of normal forwarding of the user's uplink data packet is solved.

The PPPoE protocol packet sniffer obtains the value of the Ethernet protocol field firstly and, if the PPPoE is in the PPP Session Stage (0x8864), obtains the PPP packet header protocol field and, if the value is 0021, the packet type is considered as a PPPoE data packet. The PPPoE protocol packet sniffer obtains the MAC address from the Ethernet packet header and the IP address from the IPV4 packet header, and compares the MAC address and the IP address with the entries in the authentication address table and, if match, forwards the packet to the Internet-side, otherwise, throws away the packet. If the packet type is not a PPPoE data packet, the other processing of the PPPoE control packet is performed.

The IPV4 protocol packet sniffer is called when the user's downlink packet passes through the PPPoE server. The IPV4 protocol packet sniffer, according to the contents of the authorized user information list, determines whether the target user of the packet has successfully authenticated. If the target user is an authenticated user, the IPV4 protocol packet sniffer adds the PPPoE packet header and performs the forwarding to forward the packet to the network card arranged at the client-side. As such, the problem of normal forwarding of the user's downlink data packet is solved.

Figure 4:
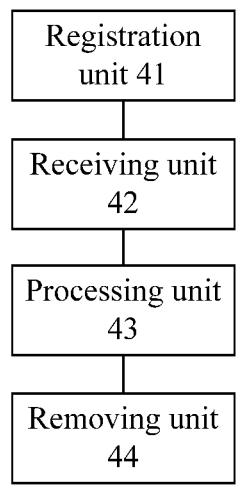
FIG. 4 is a block diagram of a PPPoE server according to embodiments of the present disclosure.

The embodiments of the present disclosure also provide a PPPoE server, which can be used to implement the above-described method for transmitting PPPoE packets. The specific implementation thereof may refer to the above-described method according to embodiment of the present disclosure. As shown in FIG. 4, the PPPoE server includes a registration unit 41, a receiving unit 42, a processing unit 43, and a removing unit 44. The function of each unit is described in detail below.

The registration unit 41 is configured, after the user dial-up authorization succeeds, to register a PPPoE protocol packet sniffer with the Linux kernel and an IPV4 protocol packet sniffer with the Netfilter framework, and add the user's IP address and MAC address to authenticated user information.

The receiving unit 42 is communicated with the registration unit 41 and is configured to receive a packet.

The processing unit 43 is communicated with the receiving unit 42 and is configured to call the PPPoE protocol packet sniffer or the IPV4 protocol packet sniffer and, according to the authenticated user information, process and transmit the received packet.

The removing unit 44 communicated with the processing unit 43 is configured, after the user successfully logs off, to remove the PPPoE protocol packet sniffer from the Linux kernel and the IPV4 protocol packet sniffer from the Netfilter framework, and delete user's corresponding information from the authenticated user information. The removing unit 44 is not a necessary unit, which corresponds to the situation when the PPPoE protocol packet sniffer and the IPV4 protocol packet sniffer are registered every time that the user logs on the Internet. That is, if the PPPoE server removes the PPPoE protocol packet sniffer from the Linux kernel and the IPV4 protocol packet sniffer from the Netfilter framework, and deletes the user's corresponding information from the authenticated user information, then the PPPoE protocol packet sniffer and the IPV4 protocol packet sniffer need to be registered every time that the user logs on the Internet.

In the above-described embodiment, the registration and deletion of a IPV4 protocol packet sniffer in the Netfilter framework and a PPPoE protocol packet sniffer in the Linux kernel are used to replace the creation and deletion of a virtual network interface, and the authenticated user information is stored. After receiving the packet, the PPPoE server calls the corresponding protocol packet sniffer and according to the authenticated user information to process the packet header and transmit the processed packet. As such, the correct processing and the normal transmission of the user's uplink data packets and downlink data packets can be ensured. The time cost for the creation of the network interface during the logon process and the time cost for the destruction of the network interface during the logoff process are reduced, such that the logon and logoff speeds for user dial-up during the process of a PPPoE broadband access on the Linux platform can be effectively increased.

The registration unit 41 is specifically used to register the PPPoE protocol packet sniffer with the Linux kernel and the IPV4 protocol packet sniffer with the POSTROUTING chain of the Netfilter framework.

The processing unit 43 includes a determination module, a first call module, and a second call module. The determination module is configured to determine whether the packet is a user's uplink packet or a user's downlink packet. The first call module communicated with the determination module is configured, when the packet is the user's uplink packet, to call the PPPoE protocol packet sniffer. The PPPoE protocol packet sniffer determines whether the received packet is a PPPoE data packet and, if the received packet is a PPPoE data packet, according to the authenticated user information, strips off header information of the PPPoE data packet, and forwards the processed PPPoE data packet to the Internet-side. The second call module communicated with the determination module is configured, when the packet is the user's downlink packet, to call the IPV4 protocol packet sniffer. The IPV4 protocol packet sniffer, according to the authenticated user information, adds header information to the user's downlink packet and forwards the processed PPPoE data packet to the user.

For the user's uplink data packets and downlink data packets, the sniffers used are different and the processing of the header information is also different. Therefore, the packet needs to be determined to further determine the subsequent processing procedure and realize the normal forwarding of the user's uplink data packets and downlink data packets. At the same time, it is also necessary to determine, according to the authenticated user information stored in advance, whether the current user has authenticated. If the user is not authenticated, the unnecessary packet is directly thrown away to avoid the occupation of resources. If the user is authenticated, the packet is forwarded to the corresponding user or the Internet-side to ensure the smooth transmission of the packet.

The PPPoE protocol packet sniffer includes: a first determination module configured, according to the value of the Ethernet packet protocol field, to determine that the PPPoE is currently in the PPP Session Stage; a second determination module that is communicated with the first determination module, configured, according to the PPP packet header protocol field, to determine that the packet is a PPPoE data packet; a first acquisition module that is communicated with the second determination module, configured to obtain the MAC address from the Ethernet packet header and the IP address from the IPV4 packet header; a first comparison module that is communicated with the first acquisition module, configured to compare the MAC address and IP address with information in the authenticated user information; a first forwarding module that is communicated with the first comparison module, configured, under the matching situation, to determine that the user belongs to the authenticated users and strip off header of the PPPoE data packet to forward the processed PPPoE data packet to the Internet-side; a first throw-away module that is communicated with the first comparison module, configured, under the non-matching situation, to determine that the user does not belong to the authenticated users and throw away the PPPoE data packet. If the intercepted packet is not a PPPoE data packet, the processing of the PPPoE control packet is entered, and the control packet processing method will not be discussed in the present disclosure.

The IPV4 protocol packet sniffer includes: a second acquisition module is configured to obtain the user's IP address from the IPV4 packet header; a second comparison module that is communicated with the second acquisition module, configured to compare the IP address with information in the authenticated user information; a second forwarding module that is communicated with the second comparison module, configured, under the matching situation, to determine that the user belongs to the authenticated users and add the header information to the user's downlink packet to forward the processed packet to the user; a second throw-away module that is communicated with the second comparison module, configured, under the non-matching situation, to determine that the user does not belong to the authenticated users and throw away the downlink packet.

In practical applications, in the following server configuration, the parallel logon speed increases from 300 per sec to 1000 per sec, and the parallel logoff speed increases from 200 per sec to 800 per sec. Therefore, the user's logon and logoff speeds can be greatly improved according to the solution of the present disclosure.

Model: PowerEdge R620.
CPU: Intel® Xeon® CPU E5-2630 v2 @2.60 Ght; double.
Random Access Memory (RAM): 64G.
Network card: 82599ES 10-Gigabit SFI/SFP+Network Connection; double Operating system: CentOS 7.1
Kernel version: Linux-3.10.0-229.1.2.e17

The foregoing embodiments of the apparatus are merely illustrative, and the units described as separate components may or may not be physically separate, while the components illustrated as units may or may not be physical units, that is, they can be co-located or can be distributed onto a plurality of network elements. A part or all of the modules therein can be selected as required in practice to achieve the objective of the solution of the embodiments. Those ordinarily skilled in the art can appreciate and implement the solution of the embodiments without any inventive effort.

Through the description of the aforementioned embodiments, a person in the art may clearly understand that the present disclosure may be realized in the form of software plus the necessary common hardware platform. Based on this understanding, the aforementioned technical solution, in essence, or in the form of a contribution to the prior art, or part of thereof, can be embodied in the form of a software product. The computer software product may be stored on a computer-readable media, such as a ROM/RAM, a magnetic disk, or an optical disk, and the like. The computer software product may include a certain number of computer-executable instructions that make a computer device (such as a personal computer, a server, or a network equipment) to execute the methods described in each embodiment, or certain portions of the embodiments, of the present disclosure.

The foregoing is merely preferred embodiments of the present disclosure and is intended to limit the present disclosure. Any alterations, equivalents, or advantages within the spirit and principles of the present disclosure are intended to be encompassed within the scope of the present invention.

What is claimed is:

1. A method for transmitting Point-to-Point Protocol over Ethernet (PPPoE) packets, comprising:
    registering, by a PPPoE server, a PPPoE protocol packet sniffer with a Linux kernel and an Internet Protocol Version 4 (IPV4) protocol packet sniffer with a Netfilter framework, and adding a user's Internet Protocol (IP) address and media access control (MAC) address to authenticated user information;
    receiving, by the PPPoE server, a packet; and
    calling, by the PPPoE server, the PPPoE protocol packet sniffer or the IPV4 protocol packet sniffer to process and transmit the packet according to the authenticated user information, including:
        determining, by the PPPoE server, whether the packet includes a user's uplink packet or a user's downlink packet;
        when the packet includes the user's uplink packet, processing the user's uplink packet via the PPPoE protocol packet sniffer; and
        when the packet includes the user's downlink packet, processing the user's downlink packet via the IPV4 protocol packet sniffer.

2. The method according to claim 1, wherein calling, by the PPPoE server, the PPPoE protocol packet sniffer or the IPV4 protocol packet sniffer to process and transmit the packet according to the authenticated user information, further includes:
    when the packet includes the user's uplink packet, determining, by the PPPoE protocol packet sniffer, whether the packet includes a PPPoE data packet and, when the packet includes the PPPoE data packet, according to the authenticated user information, striping off header information of the PPPoE data packet to form a processed PPPoE data packet, and forwarding the processed PPPoE data packet to an Internet-side; and
    when the packet includes the user's downlink packet, adding, by the IPV4 protocol packet sniffer, according to the authenticated user information, header information to the user's downlink packet to form a processed packet, and forwarding the processed packet to the user.

3. The method according to claim 2, wherein determining, by the PPPoE protocol packet sniffer, whether the packet includes the PPPoE data packet and, when the packet includes the PPPoE data packet, according to the authenticated user information, striping off the header information of the PPPoE data packet to form the processed PPPoE data packet, and forwarding the processed PPPoE data packet to the Internet-side, includes:

determining, by the PPPoE protocol packet sniffer, according to a value of an Ethernet packet protocol field, that the PPPoE is currently in a PPP Session Stage;

determining, by the PPPoE protocol packet sniffer, according to a PPP packet header protocol field, that the packet includes the PPPoE data packet;

obtaining, by the PPPoE protocol packet sniffer, the MAC address from an Ethernet packet header and the IP address from an IPV4 packet header;

comparing, by the PPPoE protocol packet sniffer, the MAC address and IP address with information in the authenticated user information;

when the MAC address and IP address match with information in the authenticated user information, determining that the user belongs to authenticated users and striping off the header of the PPPoE data packet to forward the processed PPPoE data packet to the Internet-side; and when the MAC address and IP address do not match with information in the authenticated user information, determining that the user does not belong to the authenticated users and throwing away the PPPoE data packet.

4. The method according to claim 2, wherein adding, by the IPV4 protocol packet sniffer, according to the authenticated user information, header information to the user's downlink packet to form the processed pack, and forwarding the processed packet to the user, includes:

obtaining, by the IPV4 protocol packet sniffer, the user's IP address from the IPV4 packet header;

comparing, by the IPV4 protocol packet sniffer, the IP address with the information in the authenticated user information;

when the IP address matches with the information in the authenticated user information, determining that the user belongs to the authenticated users and adding the header information to the user's downlink packet to forward the processed packet to the user; and when the IP address does not match with information in the authenticated user information, determining that the user does not belong to the authenticated users and throwing away the downlink packet.

5. The method according to claim 1, further including:

registering, by the PPPoE server, the PPPoE protocol packet sniffer with the Linux kernel and the IPV4 protocol packet sniffer with the Netfilter framework every time the user logs on successfully; and every time after the user successfully logs off, removing, by the PPPoE server, the PPPoE protocol packet sniffer from the Linux kernel and the IPV4 protocol packet sniffer from the Netfilter framework, and deleting corresponding information of the user who successfully logs off from the authenticated user information.

6. The method according to claim 1, further including:

when the user logs on the Internet for a first time after user initializing or restarting, registering the PPPoE protocol packet sniffer with the Linux kernel and the IPV4 protocol packet sniffer with the Netfilter framework; and after the user successfully logs off, deleting the user's corresponding information from the authenticated user information.

7. The method according to claim 1, further including:

registering, by the PPPoE server, the IPV4 protocol packet sniffer with a POSTROUTING chain of the Netfilter framework.

8. A Point-to-Point Protocol over Ethernet (PPPoE) server, comprising a memory and processor coupled to the memory, the processor being configured to perform:

registering a PPPoE protocol packet sniffer with a Linux kernel and an IPV4 protocol packet sniffer with a Netfilter framework, and adding a user's IP address and MAC address to authenticated user information;

receiving a packet; and calling the PPPoE protocol packet sniffer or the IPV4 protocol packet sniffer to process and transmit the packet according to the authenticated user information, including:

determining whether the packet includes a user's uplink packet or a user's downlink packet;

when the packet includes the user's uplink packet, processing the user's uplink packet via the PPPoE protocol packet sniffer; and when the packet includes the user's downlink packet, processing the user's downlink packet via the IPV4 protocol packet sniffer.

9. The PPPoE server according to claim 8, wherein the processor is further configured to perform:

when the packet includes the user's uplink packet, determining, by the PPPoE protocol packet sniffer, whether the packet includes a PPPoE data packet and, when the received packet includes the PPPoE data packet, according to the authenticated user information, stripping off header information of the PPPoE data packet to form a processed PPPoE data packet, and forwarding the processed PPPoE data packet to an Internet-side; and when the packet includes the user's downlink packet, and according to the authenticated user information, adding, by the IPV4 protocol packet sniffer, header information to the user's downlink packet to form a processed pack and forwarding the processed packet to the user.

10. The PPPoE server according to claim 9, wherein the PPPoE protocol packet sniffer is configured:

according to a value of an Ethernet packet protocol field, to determine that the PPPoE is currently in a PPP Session Stage;

according to a PPP packet header protocol field, to determine that the packet is the PPPoE data packet;

to obtain the MAC address from an Ethernet packet header and the IP address from an IPV4 packet header;

to compare the MAC address and IP address with information in the authenticated user information;

when the MAC address and IP address match with information in the authenticated user information, to determine that the user belongs to authenticated users and strip off header of the PPPoE data packet to form a processed PPPoE data packet to forward the processed PPPoE data packet to the Internet-side; and when the MAC address and IP address do not match with information in the authenticated user information, to determine that the user does not belong to the authenticated users and throw away the PPPoE data packet.

11. The PPPoE server according to claim 9, wherein the IPV4 protocol packet sniffer is configured to:

obtain the user's IP address from the IPV4 packet header;

compare the IP address with the information in the authenticated user information;

when the IP address matches with information in the authenticated user information, determine that the user belongs to the authenticated users and add the header information to the user's downlink packet to form a processed packet to forward the processed packet to the user; and when the IP address does not match with information in the authenticated user information, determine that the user does not belong to the authenticated users and throw away the downlink packet.

12. The PPPoE server according to claim 8, wherein the processor is further configured to perform:

after the user successfully logs off, removing the PPPoE protocol packet sniffer from the Linux kernel and the IPV4 protocol packet sniffer from the Netfilter framework, and deleting the user's corresponding information from the authenticated user information.

* * * * *